United States Patent [19]

Barth

[11] 4,146,109
[45] Mar. 27, 1979

[54] CHASSIS SUSPENSION SYSTEM FOR AN ARTICULATED VEHICLE

[75] Inventor: John W. Barth, Topeka, Kans.

[73] Assignee: Allis-Chalmers Corporation, Milwaukee, Wis.

[21] Appl. No.: 865,674

[22] Filed: Dec. 29, 1977

[51] Int. Cl.² ............................................. B62D 5/06
[52] U.S. Cl. .................................... 180/139; 280/97; 280/126
[58] Field of Search ................ 180/134, 136, 139, 41; 280/112 R, 112 A, 772, 773, 776, 97, 89, 90, 6 R, 6 H, 125, 126, 110, 109

[56] References Cited
U.S. PATENT DOCUMENTS

| 3,051,506 | 8/1962 | Stump | 280/90 |
| 3,083,983 | 4/1963 | Wettstein | 280/702 |
| 3,086,786 | 4/1963 | Tuczek | 280/6.11 |

*Primary Examiner*—Joseph F. Peters, Jr.
*Assistant Examiner*—R. Schrecengost
*Attorney, Agent, or Firm*—Arthur L. Nelson

[57] ABSTRACT

A vehicle steering and chassis oscillation system with a steering mechanism for steering the vehicle through articulation and a chassis oscillation mechanism for controlling the transverse oscillation of the chassis through pivoting of a link in the articulating mechanism of the vehicle. The oscillation control of the chassis is accomplished through pivoting of a connecting link between the axle and the chassis to tilt the axis of articulation as the connecting link is pivoted. The oscillation of the articulating axis is generated by the suspension system for the vehicle.

10 Claims, 7 Drawing Figures

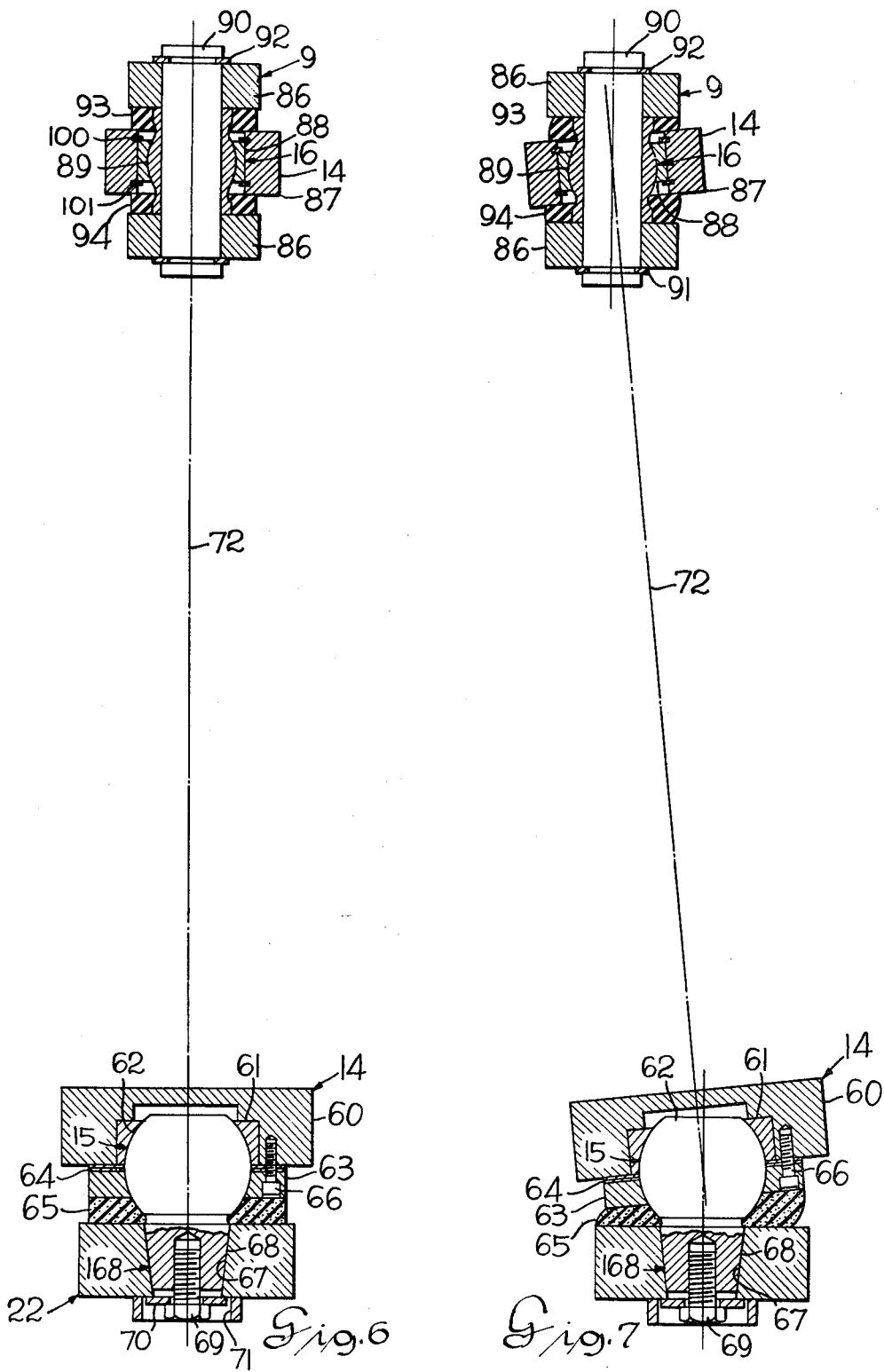

CHASSIS SUSPENSION SYSTEM FOR AN ARTICULATED VEHICLE

This invention relates to a vehicle having articulated steering and more particularly to a vehicle having hydraulically actuated articulated steering with articulating bearings and a linkage interconnecting the vehicle chassis and one axle with an interconnecting link which is pivoted through hydraulic means to transversely oscillate the articulating axis and provide a suspension system for the vehicle. A single front articulating axis may be used for steering and a single means for oscillating the articulating axis or an articulating axis on the front and the rear of the vehicle with an oscillating mechanism providing a vehicle suspension system.

The conventional articulated vehicle is steered through a steering mechanism which articulates the front frame and rear frames of the vehicle. The articulation is generally approximately at the midpoint of the vehicle. With the articulation at the midpoint of the vehicle, the articulation causes the weight of the vehicle to swing transversely which may cause instability of the vehicle, particularly if the steering causes an extreme angularity of one frame to the other and particularly where the vehicle is on a hillside. To improve the maneuverability of the vehicle and increase the stability, the articulation of the vehicle can be placed closer to the end of the vehicle and, furthermore, if the vehicle has two articulating axes where one is fore and the other is aft on the vehicle, the stability of the vehicle can be improved. One advantage is that the articulation about each articulating axis can be half of the normal articulation required by a single articulating axis at the midpoint of the vehicle. Another advantage is that with double articulation crab steering can be accomplished which is advantageous particularly when operating a vehicle on a hillside in which the terrain allows the vehicle to gradually slide downhill as it is operating. The crab steering moves both the front and the rear ends of the vehicle slightly uphill to compensate for downhill sliding as the wheels are generally rolling forwardly.

The use of an articulating linkage in which two bearings are vertically spaced and connected to the vehicle chassis and a third bearing is positioned between the axle means and a link interconnecting the chassis with the axle means provides a flexibility in the articulating linkage to allow for slight rolling of the vehicle where at least two of these bearings are spherical bearings. With this type of an articulating linkage and bearing structure, an additional oscillation control such as a suspension system can be provided to control pivoting of the connecting link. With a suitable suspension system connected to the link, the movement of the link can be controlled to oscillate the articulating axis transversely of the vehicle. This, in turn, will cause the chassis to move transversely when the vehicle is traveling.

Accordingly, this invention provides for a hydraulic steering mechanism for articulating the vehicle and a chassis oscillation mechanism which allows oscillation of the articulating axis and the chassis transversely to compensate for unevenness of the terrain upon which the vehicle is operating.

It is an object of this invention to provide an articulated vehicle having an articulating axis on either the front or the rear of the vehicle or on both the front and the rear of the vehicle with controlled oscillation of the articulated axis and chassis.

It is another object of this invention to provide an articulated steering vehicle with front and rear wheel articulated axes and an oscillation control on each of the axes of articulation to provide a suspension system of the vehicle.

It is a further object of this invention to provide articulated steering on a vehicle with vertically spaced articulated bearings and a link between one of the articulated bearings and an axle means with oscillation control means connected to the link. The hydraulic oscillation control means tilts the axis of articulation when the suspension system operates.

It is a further object of this invention to provide articulated steering on the front and on the rear of a vehicle with oscillation controls on each of the front and the rear axes of articulation to control oscillation through a linkage in the articulated steering mechanism by means of a suspension system.

The objects of this invention are accomplished by providing an axis of articulation on an articulated vehicle on the front of the vehicle and also an articulating axis on the rear of the vehicle. For the purpose of illustration, hydraulic means are provided for articulating each of the axles relative to the vehicle chassis although any suitable motor means may be used. Each of the articulating axes are defined by an upper and a lower articulating bearing. At least one of the articulating bearings is a spherical bearing pivotally connecting an axle with the vehicle chassis. The other of the articulating bearings is connected through a link to pivotally connect to the axle. One of the bearings connecting the link is also a spherical bearing. Accordingly, a limited amount of roll is permitted of the vehicle chassis relative to the axles of the vehicle. An oscillation control is provided by connection of the link through spring and shock absorbers to the axle to provide controlled pivoting of the link. This, in turn, oscillates the articulating axis transversely and likewise controls the level of the vehicle chassis relative to the axle. The hydraulic oscillation control may be allowed to float to permit the vehicle chassis to roll relative to the axles.

The preferred embodiments of this invention are illustrated in the attached drawings.

FIG. 6 is a front cross-section view of the articulating bearings and the chassis taken on line VI—VI of FIG. 1; and FIG. 7 is a cross-section view of the articulating bearings oscillated to tilt the chassis of the vehicle.

Figure 1:
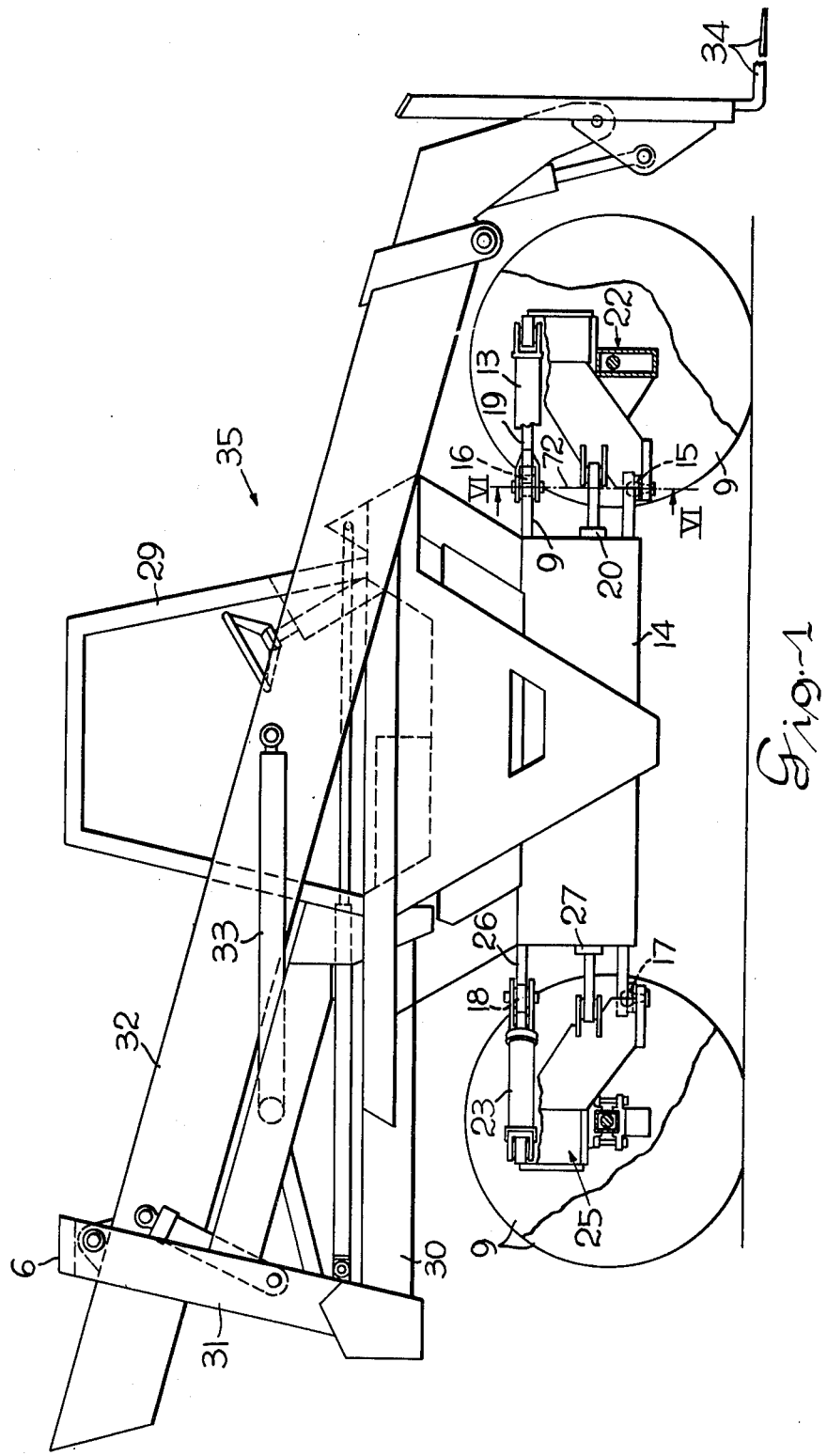
FIG. 1 is a side elevation view of a rough terrain fork lift vehicle.
Figure 2:
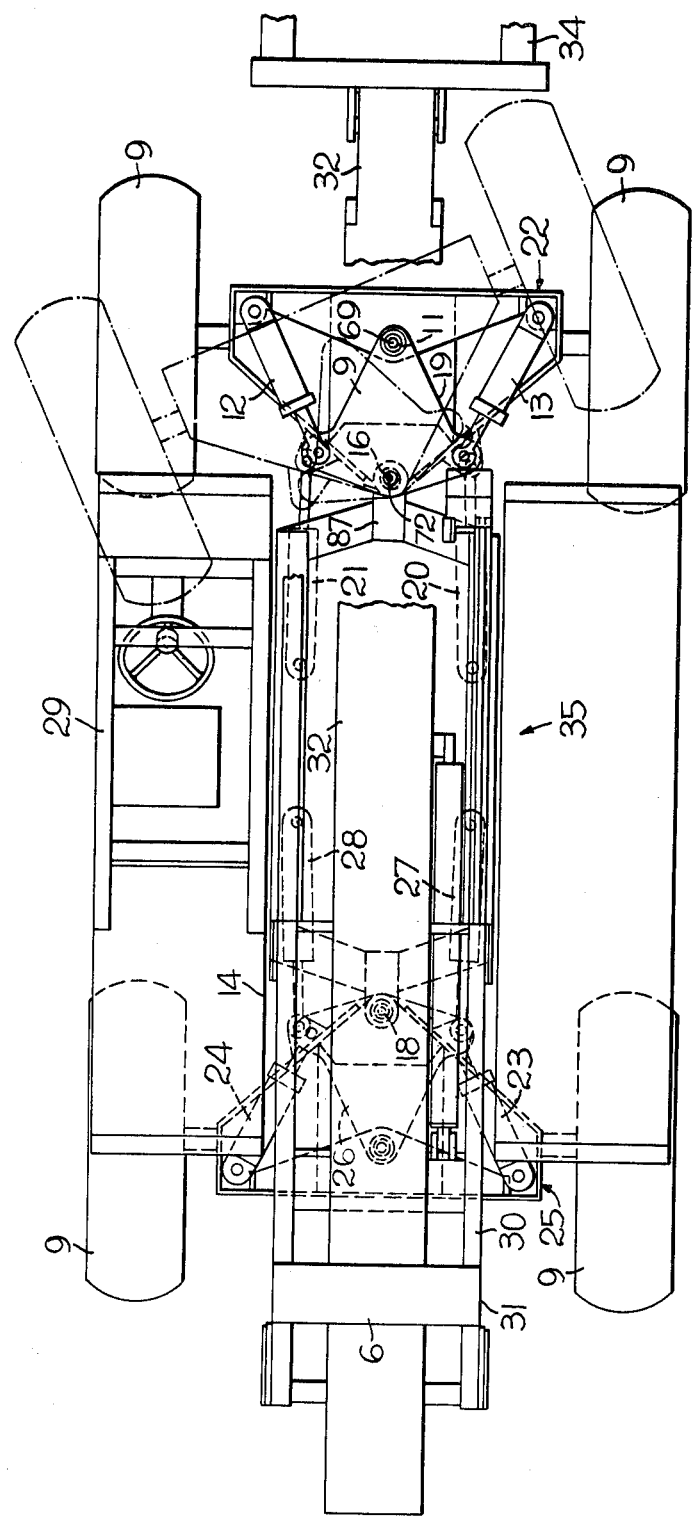
FIG. 2 is a plan view of the rough terrain fork lift vehicle.

Referring to FIGS. 1 and 2, the vehicle 35 includes the chassis 14 carried on the front axle 22 and rear axle 25 by articulating bearings. The extendible boom 32 is pivotally supported on the cradle 6 mounted on the carriage 30 slideably mounted on the vehicle chassis 14. The cab 29 defining the operator station is also supported on the vehicle chassis. The plurality of wheels 164 rotatably support the front and rear axles.

The vehicle chassis 14 can be oscillated transversely on the front axle 22 and also on the rear axle 25. The connecting link 9 is pivotally connected through bearing 11 to the front axle 22 and pivotally connected to the chassis 14 through one of the articulating bearings 16. The link 9 can be pivoted transversely relative to the front axle 22 or the chassis 14 by means of the hydraulic actuators 12 and 13. The linkage and oscillating mechanism will be subsequently described.

The vehicle chassis 14 is supported on articulating bearings 15, 16 on the front and 17, 18 on the rear of the vehicle. The link 9 is pivotally connected through the articulating bearing 16 to the vehicle chassis 14. A pair of hydraulic actuators 12 and 13, of which 13 is shown in FIG. 1, pivot the link 9 to oscillate the vehicle chassis 14 transversely. Hydraulic actuators 12 and 13 are pivotally connected to axle 22 at 160 and 161 and are pivotally connected to link 19 at 162 and 163. The hydraulic actuators 20 and 21 articulate the axle 22 for steering of the front end of the vehicle. Similarly, the hydraulic actuators 23 and 24 articulate the link 26 to transversely oscillate the vehicle chassis 14. The hydraulic steering cylinders 27 and 28 steer the rear axle 25 relative to the articulating bearings 17 and 18.

The chassis 14 carries the cab 29 and also slideably carries the carriage 30 as shown in FIG. 1. The carriage 30 supports the tower 31 on which the boom 32 is pivotally mounted. The boom 32 is pivoted by the hydraulic actuator 33 mounted on the carriage. The front end of the boom 32 carries the fork 34 for carrying a load.

A plan view of the fork lift truck 35 is shown in FIG. 2. The hydraulic cylinders 12 and 13 pivotally oscillate the link 19. The articulation is accomplished through the hydraulic steering cylinders which pivotally connect the chassis 14 with the front axle 22.

Figure 3:
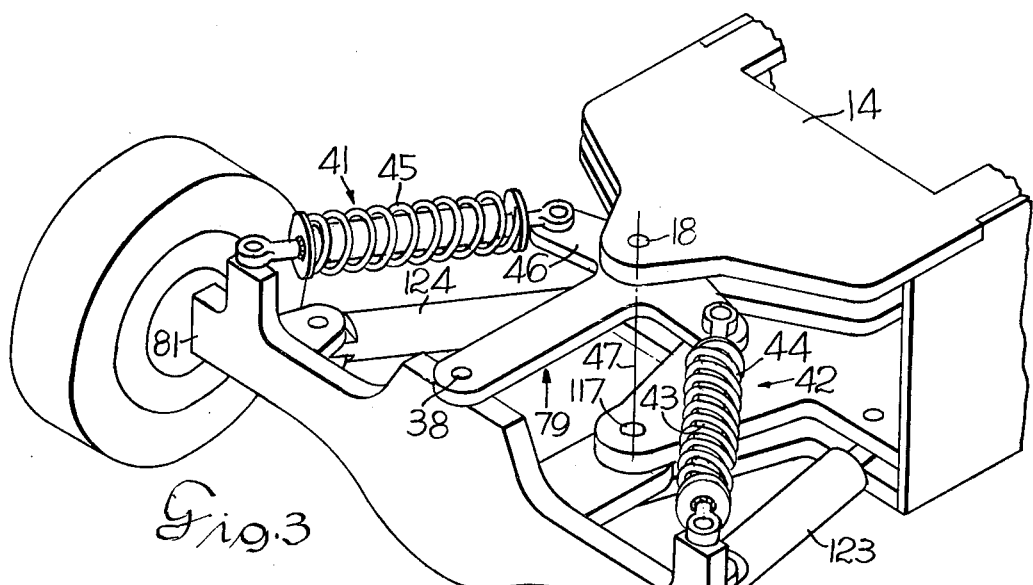
FIG. 3 is a three-dimensional view of a modification of the articulating bearings and linkage and the hydraulic steering means with a suspension system controlling oscillation of the articulating axis.

FIG. 3 illustrates a modification of the invention in which the oscillating linkage 79 oscillating the articulating axis is controlled by a vehicle suspension system. The link 46 is pivotally mounted on the articulating bearing 18 on the vehicle chassis 14. The link 46 is also pivotally connected to the axle 25 by means of a bearing 38. The hydraulic actuators 123 and 124 steer the vehicle through hydraulic means. Each of the links 41 and 42 include a shock absorber 43 as shown in link 42 and a spring 44. The springs 44 and 45 work in opposition to each other to maintain a centered position of link 46 on the axis of articulation 47. Each end of the axle 25 is allowed to roll relative to the chassis 38 due to roughness of the terrain. The roll is restrained by the links 41 and 42 which absorb shock and allow the wheels to ride over the roughness of the terrain and provide a soft ride for the occupant in the vehicle.

Figure 4:
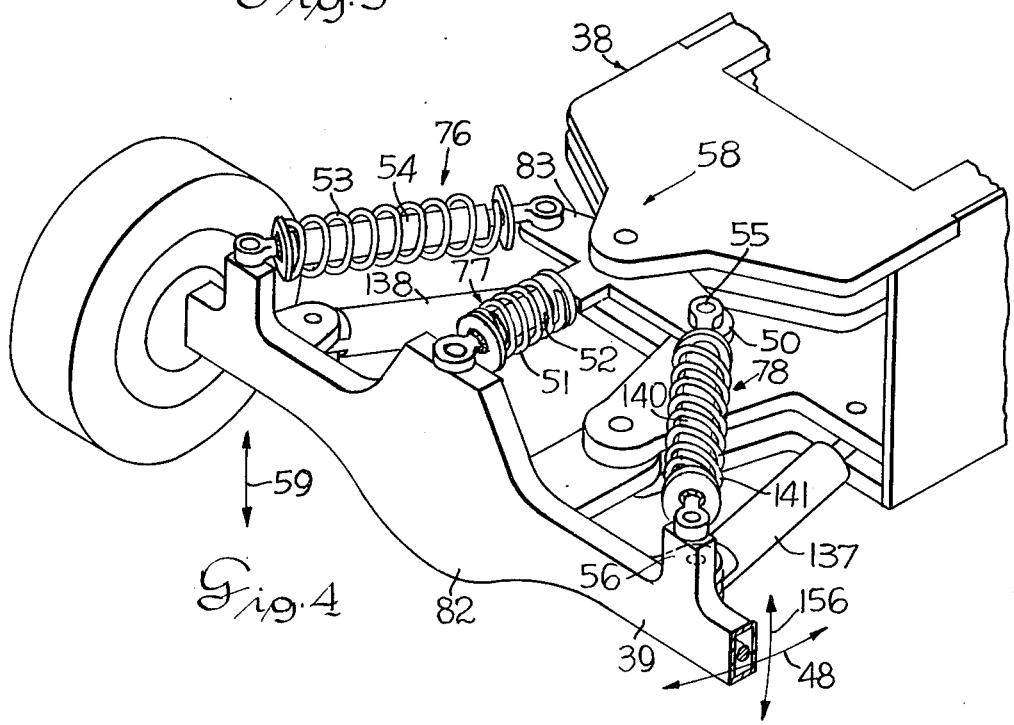
FIG. 4 is a modification of the articulating bearings, linkage and hydraulic steering means with a suspension means including a resilient articulating link controlling the oscillation of the articulating axis.

FIG. 4 is a modification of the articulating steering mechanism and the chassis oscillating mechanism shown in FIG. 3. The steering cylinders 137 and 138 steer the vehicle by pivoting the chassis 38 relative to the front axle 39. The link 77, however, is modified to accommodate the mounting of a spring 51 embracing a shock absorber 52. Similarly, the spring 53 embraces the shock absorber 54. To provide balance in the oscillation control system, a shock absorber 140 and spring 141 are also positioned between the pivot pin opening 55 and the spring and shock absorber mounting 56 of link 78.

The steering of the vehicle is shown by a movement indicated by the arrow 48 and oscillation is shown by the arrow 156. A vertical ride reaction of the suspension system 58 is shown by the arrow 59.

Figure 5:
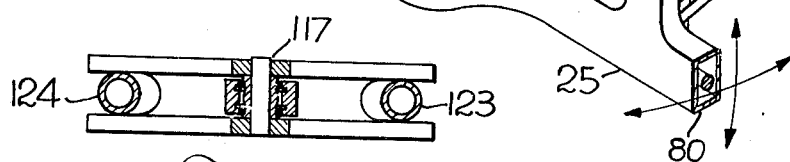
FIG. 5 is an enlarged cross-section view of the lower spherical bearing for the axle and chassis on the vehicle shown in FIG. 3.

FIG. 5 illustrates a cross-section view of the lower articulating bearing 117 showing that the hydraulic cylinders 124 and 123 operate through the center of the bearing and do not cause any loading above or below the bearing 117 which may produce any torque on the articulating axis due to steering of the vehicle. Accordingly, steering of the vehicle would not create any force or moment which would affect operation of the links 41 and 42 of the suspension system as shown in FIG. 3.

Referring to FIG. 6, the chassis 14 carries the bearing support 60 which embraces the bearing race 61 forming a spherical socket receiving the ball 62. The bearing race 63 is bolted against the shims 64 to form a socket for the ball 62. The seal 65 forms a seal between the bearing race 63 and the front axle 22 permitting the front axle 22 to tilt relative to the bearing support 60 of the chassis. A plurality of bolts, of which bolt 66 is shown, provides the fastening means for the bearing race 63.

The cone section 68 integral with the ball 62 extends downwardly and is received within the conical recess 67 in the front axle 22. The bolt 69 is bolted against the washer 70 to fasten the bearing element 68 to the front axle 22. The bolt and washer are recessed within the annulus 71 as shown in FIG. 6.

FIGS. 6 and 7 show the articulating joints for the vehicle. The articulating axis 72 is defined by the upper articulating bearing 16 and the lower articulating bearing 15. The lower articulating bearing 15 forms a ball and socket joint.

The upper bearing assembly 16 includes a clevis 86 extending from the link 9. The plate 87 extends from the chassis 14 and receives the bushing 88 which in turn embraces the spherical bushing 89. Bushing 88 is retained by snap rings 100 and 101. The pin 90 is formed with an annular recess receiving snap ring 91 engaging the underside of the clevis 86 and extends through the spherical bushing 89. The upper end of pin 90 is formed with an annular recess to receive snap ring 92. The bearing assembly on its outer periphery is sealed by seals 93 and 94. Accordingly, the articulating bearings 15 and 16 define a common axis and this axis can pivot within either of the upper or lower bearing assemblies.

FIG. 7 illustrates a cross-section view of the articulating axis similar to FIG. 6. The chassis is tilted by oscillating the link 9 on the upper end of articulating axis 72. The tilting of the axis controls the level of the vehicle chassis 14. Preferably, a single articulating axis will control the level of the vehicle. If there is a second articulating axis on the vehicle on the opposing end of the vehicle as shown, it may be permitted to float so that a single axis controls the level of the chassis. If, however, the other axis of the vehicle is also used in controlling the level of the vehicle, a suitable hydraulic system must be used so that the level of the vehicle is controlled through the single hydraulic system so both axes carry the load.

The operation of this device will be described in the following paragraphs.

The articulation of the vehicle is controlled through the hydraulic actuators 20 and 21. Extension and contraction of the hydraulic actuators 20 and 21 pivot the vehicle on the articulating axis 72. The vehicle is steered in this manner. An articulating axis may be provided on the front end and the rear end as well. By providing two articulating axes, the required angle of articulation for steering is reduced and the stability of the vehicle is increased. A suitable hydraulic system is provided with a control valve for articulating the vehicle by hydraulic means as illustrated.

The oscillation of the articulating axis controls the level of the vehicle chassis. The axis 72 is oscillated by the operation of the hydraulic actuators 12 and 13. As the link 9 is articulated to the position as shown in FIG. 2, the axis of articulation tilts about the lower bearing 15. As the articulating axis is tilted to a position shown in FIG. 7, the level of the chassis is tilted. This is accomplished by the operation of the hydraulic cylinders 12 and 13 in response to a control valve in the hydraulic system. Accordingly, the level of the vehicle is controlled through the oscillation of the articulating axis. The leveling system may be used on a tractor on uneven terrain, or a lift truck, a combine or any vehicle which requires a level chassis for ideal operation. Accordingly, it can be seen that the articulation of the vehicle is for steering while the oscillation of the articulating axis transversely controls the level of the vehicle chassis.

FIG. 3 illustrates the suspension system for an articulated vehicle whereby the front axle 25 tends to pivot and roll as the vehicle travels over rough terrain. As the end 80 of the axle 25 lifts, the link 42 compresses forcing the link 79 to pivot on the bearing 18. This in turn tends to effectively shorten the distance between bearing 38 and 18 while the link 41 is being compressed. The front axle 25 tends to roll rearwardly on its axis and the chassis 38 tilts slightly. The linkage 37 including the link 79 and resilient links 42 and 41 allow movement of the chassis which absorbs the impact from the end 80 of the front axle 21 to shift. Similarly, when the end 81 of the axle is raised or lowered, the linkage allows movement of the axle and permits a slight roll to accommodate the roughness in the terrain. Each of the links 41 and 42 include a shock absorber which also absorbs shock as the vehicle travels over the terrain. Normally the springs 45 and 44 of the links 42 and 41 maintain a centered position of the link 46 when the vehicle is traveling over a level surface.

Referring to FIG. 4, the suspension system is basically the same as that shown in FIG. 3. When either end of the axle 82 is raised, the link on this end tends to compress and shift the linkage toward the opposite end. The difference in operation of this device is in that the two links 76 and 78 on each of the arms of the link 83 will not only cause a shifting of the linkage but the center link 77 will also permit the front axle to roll on its axis to a greater extent than that shown in FIG. 3. This linkage is more resilient in absorbing shock than that shown in FIG. 3 since the axle is allowed to roll fore and aft more easily. The basic operation is the same and the springs in the link 76 and 78 maintain a centered position of the linkage during normal operation when the vehicle is traveling on a level surface.

The embodiments of the invention in which an exclusive property or privilege is claimed are defined as follows:

1. An articulated vehicle comprising, means defining an axis of articulation including a vehicle chassis, an upper and a lower vertically spaced bearing mounted on said chassis defining an articulating axis, at least one of said bearings comprising a universally pivotal bearing, an axle means pivotally connected to the universally pivotal bearing, a link pivotally connected to the other one of said bearings, a bearing pivotally connecting said link to said axle means, at least one of said bearings connected to said link comprising a universally pivotal bearing, a steering mechanism connected between said chassis and said axle means selectively pivoting said axle means relative to said chassis for steering said vehicle, a suspension system providing a mechanism for selectively pivoting said link relative to said axle responsive to unevenness in the terrain including said link, a resilient member connected on each side of said link and connected to said front axle to normally bias said link to a centered position, each of said resilient members including a spring and a shock absorber connected between said link and said axle.

2. An articulated vehicle as set forth in claim 1 wherein said link defines a transverse arm pivotally connected to each of said resilient members, said resilient members biasing said link and said chassis to the centered position.

3. An articulated vehicle as set forth in claim 1 wherein said link includes resilient means compressably positioned between said pivotal bearing connecting said link to said chassis and said bearing connecting said link to said axle means.

4. An articulated vehicle as set forth in claim 1 wherein said link includes a spring and a shock absorber compressably positioned between said articulating bearing connecting said link to said chassis and said bearing pivotally connecting said link to said axle means.

5. An articulated vehicle as set forth in claim 1 wherein said link defines a T-shaped member, the center position of said link includes said bearings pivotally connecting said link with said axle means and said link with said axis.

6. An articulated vehicle as set forth in claim 1 wherein said link defines a T-shaped member, the center position of said T-shaped member includes a spring compressably positioned on said link between said articulating bearing connecting said link with said chassis and said link with said axle means.

7. An articulated vehicle as set forth in claim 1 wherein said steering mechanism and said lower articulating bearing transmit steering forces and a rection force lying in the same plane.

8. An articulated vehicle as set forth in claim 1 wherein said link defines a T-shaped member, said resilient members and said upper articulating bearing transmit forces lying in the same plane.

9. An articulated vehicle as set forth in claim 1 wherein said axle means and said upper articulated bearing connecting said link to said chassis and said lower articulated bearing define spherical bearings to accommodate pitch and roll of the suspension system on said vehicle.

10. An articulated vehicle as set forth in claim 1 wherein said link defines a T-shaped member, and said resilient members connected to the arms of said T-shaped member normally bias said link to a centered position coincidental to the longitudinal axis of said vehicle chassis.

* * * * *